(12) United States Patent
Berg et al.

(10) Patent No.: US 10,402,436 B2
(45) Date of Patent: Sep. 3, 2019

(54) AUTOMATED VIDEO CATEGORIZATION, VALUE DETERMINATION AND PROMOTION/DEMOTION VIA MULTI-ATTRIBUTE FEATURE COMPUTATION

(71) Applicant: Pixel Forensics, Inc., Burlington, MA (US)

(72) Inventors: Jared Berg, Westbrook, CT (US); Zachary Maybury, Chelmsford, MA (US); Andrew E. Merlino, Burlington, MA (US); Bahram Dahi, Milpitas, CA (US); Dean Doody, Middletown, MD (US); Cheniel Chadowitz, Allston, MA (US); Marc Reichman, Wauwatosa, WI (US)

(73) Assignee: Pixel Forensics, Inc., Burlington, MA (US)

( * ) Notice: Subject to any disclaimer, the term of this patent is extended or adjusted under 35 U.S.C. 154(b) by 674 days.

(21) Appl. No.: 15/153,187

(22) Filed: May 12, 2016

(65) Prior Publication Data

US 2017/0329769 A1    Nov. 16, 2017

(51) Int. Cl.
| | |
|---|---|
| *G06F 16/30* | (2019.01) |
| *G06F 16/41* | (2019.01) |
| *G06F 16/71* | (2019.01) |
| *G06F 16/28* | (2019.01) |
| *G06F 16/438* | (2019.01) |
| *G06F 16/783* | (2019.01) |
| *G06F 16/78* | (2019.01) |

(Continued)

(52) U.S. Cl.
CPC ........ *G06F 16/41* (2019.01); *G06F 16/24578* (2019.01); *G06F 16/285* (2019.01); *G06F 16/438* (2019.01); *G06F 16/71* (2019.01); *G06F 16/7837* (2019.01); *G06F 16/7867* (2019.01); *G06K 9/00718* (2013.01)

(58) Field of Classification Search
CPC ..................... G06F 16/24578; G06F 16/7837
See application file for complete search history.

(56) References Cited

U.S. PATENT DOCUMENTS

| | | |
|---|---|---|
| 4,930,013 A | 5/1990 | Leaning |
| 7,907,185 B2 | 3/2011 | Huggett |
| 8,233,708 B2 | 7/2012 | Yamauchi et al. |

(Continued)

OTHER PUBLICATIONS

Article entitled "VideoQ: An Automated Content Based Video Search System Using Visual Cues", Copyright 1997, by Chang et al.*

(Continued)

*Primary Examiner* — Mahesh H Dwivedi
(74) *Attorney, Agent, or Firm* — David J. Thibodeau, Jr.; VP Law Group, LLP

(57) ABSTRACT

Techniques for automatically rank-ordering media assets based on custom-user profiles by computing features attributes from the media assets, and then applying a custom profile using its attribute weights and signs to create a final promotable value coefficient for each media asset. Then, using the value coefficient for each asset, a triage-able ranked order to the media assets can be created, with those assets the profile determines most promotable appearing first to the user.

14 Claims, 11 Drawing Sheets
(5 of 11 Drawing Sheet(s) Filed in Color)

(51) Int. Cl.
*G06F 16/2457* (2019.01)
*G06K 9/00* (2006.01)

(56) References Cited

U.S. PATENT DOCUMENTS

| | | | |
|---|---|---|---|
| 8,295,611 | B2 | 10/2012 | Berg et al. |
| 8,364,671 | B1 | 1/2013 | Sinton et al. |
| 8,452,778 | B1 | 5/2013 | Song et al. |
| 8,891,020 | B2 | 11/2014 | Kapoor |
| 9,087,125 | B2 | 7/2015 | Berg et al. |
| 9,143,742 | B1 | 9/2015 | Amira et al. |
| 9,235,625 | B2 | 1/2016 | Lewis et al. |
| 2008/0189272 | A1 | 8/2008 | Powers et al. |
| 2009/0006368 | A1* | 1/2009 | Mei .................... H04N 7/17318 |
| 2009/0222437 | A1* | 9/2009 | Niu ........................ G06F 16/951 |
| 2012/0054132 | A1* | 3/2012 | Aberdeen ............. G06Q 10/10 706/12 |
| 2012/0269441 | A1* | 10/2012 | Marchesotti .......... G06T 7/0002 382/195 |
| 2013/0038737 | A1 | 2/2013 | Yehezkel et al. |
| 2013/0198174 | A1 | 8/2013 | Poznanski et al. |
| 2014/0074857 | A1 | 3/2014 | Liu et al. |
| 2014/0250180 | A1 | 9/2014 | Tseng |
| 2015/0363635 | A1* | 12/2015 | Suri .................... G06K 9/00268 386/241 |
| 2016/0026707 | A1 | 1/2016 | Ong et al. |
| 2016/0042252 | A1* | 2/2016 | Sawhney ................ G06F 16/50 382/190 |
| 2017/0124400 | A1* | 5/2017 | Yehezkel Rohekar ...................... G06K 9/00335 |

OTHER PUBLICATIONS

Article entitled "Automatic Facial Feature Detection for Facial Expression Recognition", dated May 2010, by Danisman et al.*
Web-Archive Screenshot of Video Profiling, by Pixel Forensics, dated Oct. 26, 2015.*

* cited by examiner

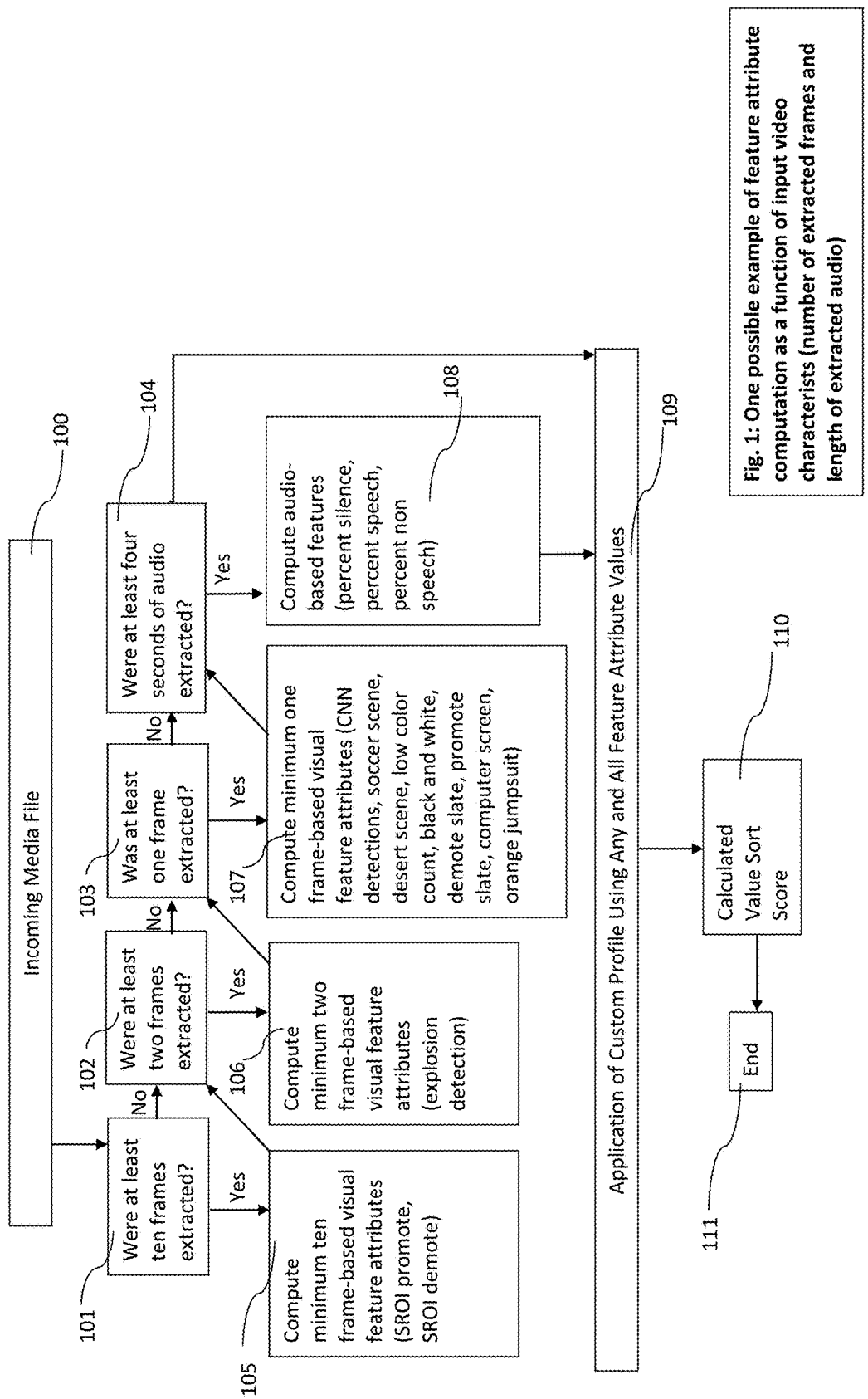

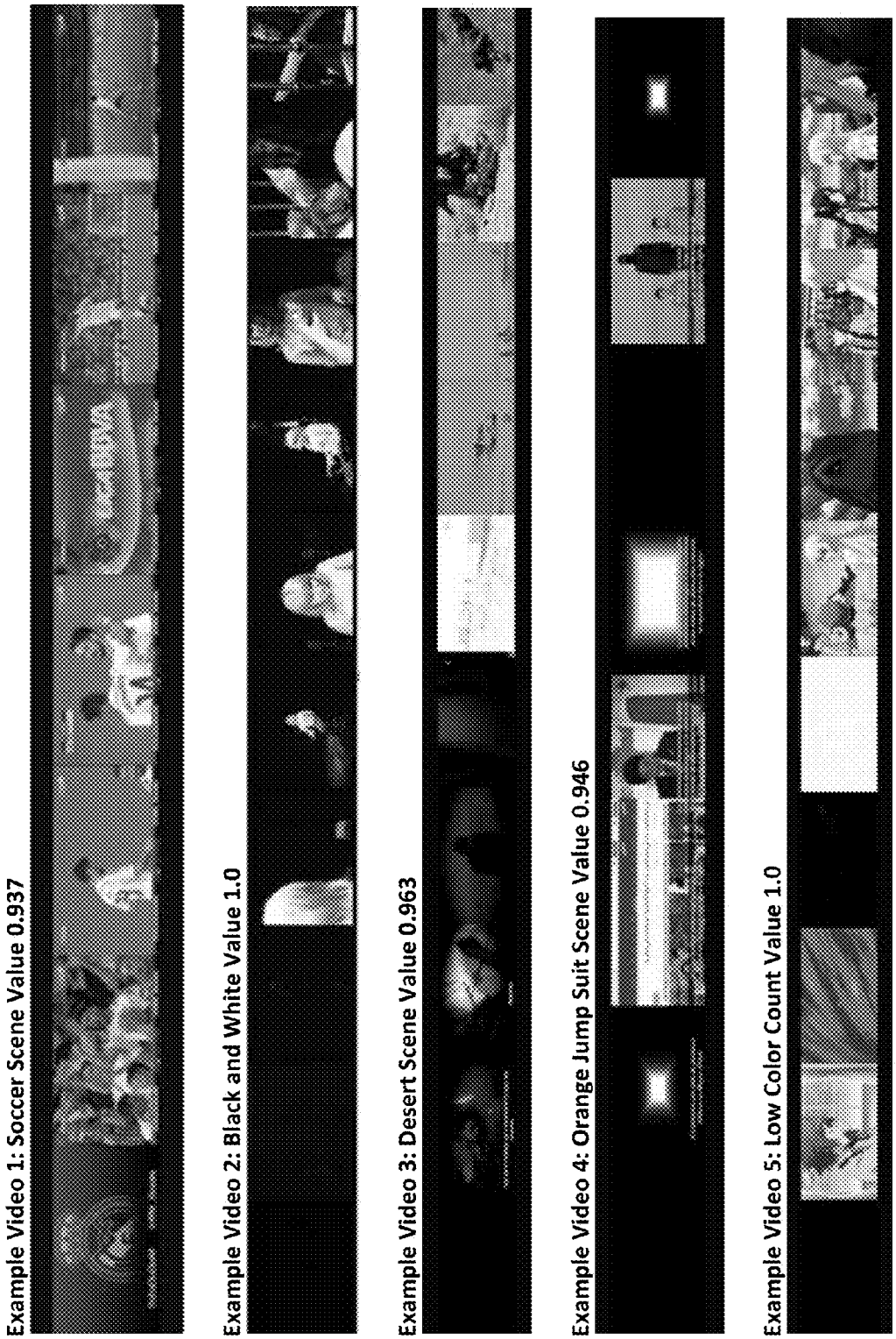
Fig. 2a: 5 different videos and their representative frame storyboards, and a maximal feature attribute that correlates very highly to the depicted content.

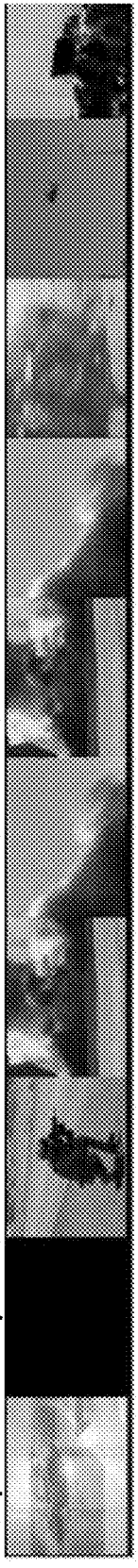
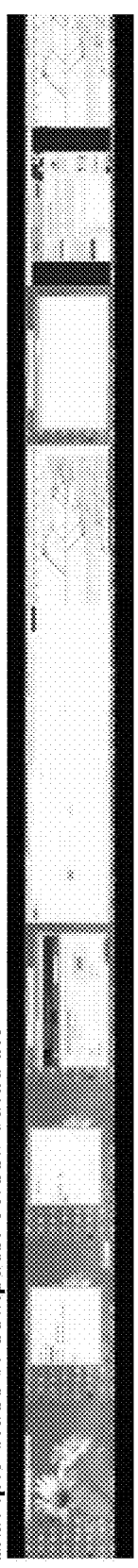
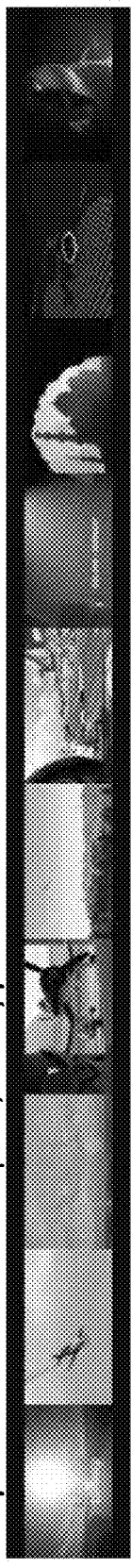
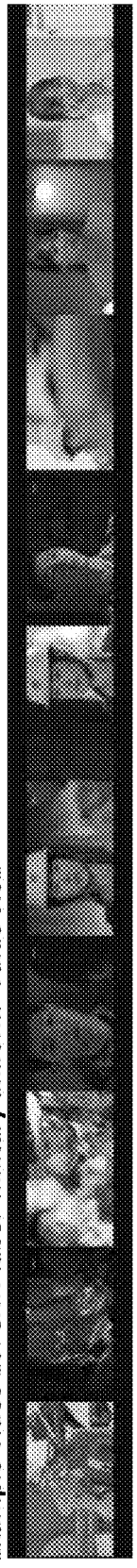
Fig. 2b: Analogous to Fig. 2a, a different 5 videos and their representative frame storyboards, and a maximal feature attribute that correlates very highly to the depicted content.

Example Video 11: Multiple simulataneous select feature attributes and their values

| Feature Attribute Name | Feature Attribute Value |
|---|---|
| blackAndWhite | 0.05 |
| ComputerScreen | 0.40 |
| desertScene | 0.0 |
| orangeJumpSuit | 0.976 |
| lowColorCount | 0.0 |
| nonSpeech | 0.573 |
| Speech | 0.423 |
| Silence | 0.003 |
| slatePromote | 0.0 |
| slateDemote | 0.0 |
| SROIPromote | 0.0 |
| SROIDemote | 0.0 |
| soccerScene | 0.0 |
| CNN Label 'prison, prison house' | 0.862 |
| CNN Label 'warplane, military plane' | 0.823 |
| CNN Label 'theater curtain, theatre curtain' | 0.801 |

Fig 2c: Multiple simulatanous select feature attributes and their values for a single video.

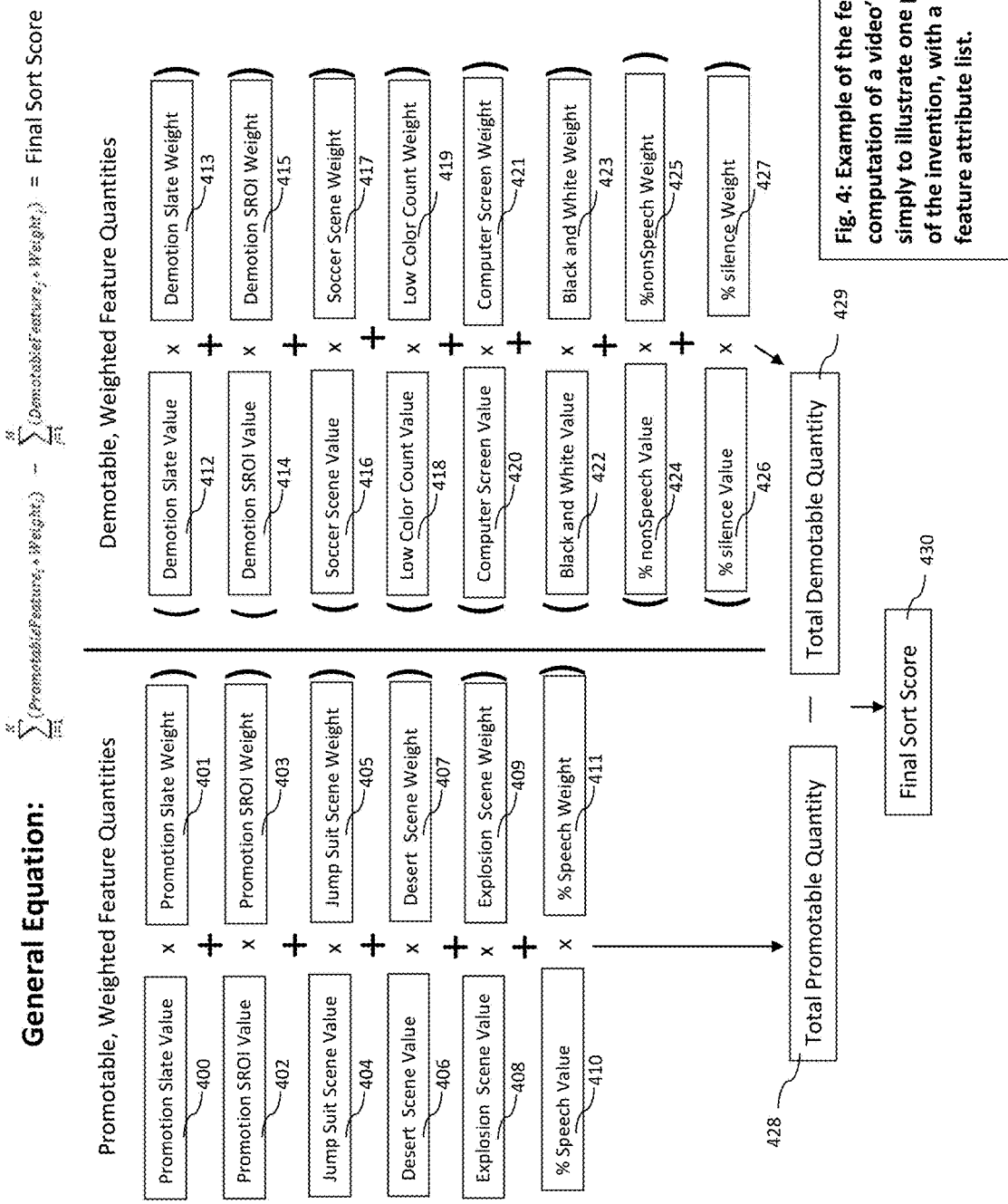
Fig. 4: Example of the feature attribute-based computation of a video's sort score. This is simply to illustrate one potential embodiment of the invention, with a specific profile and feature attribute list.

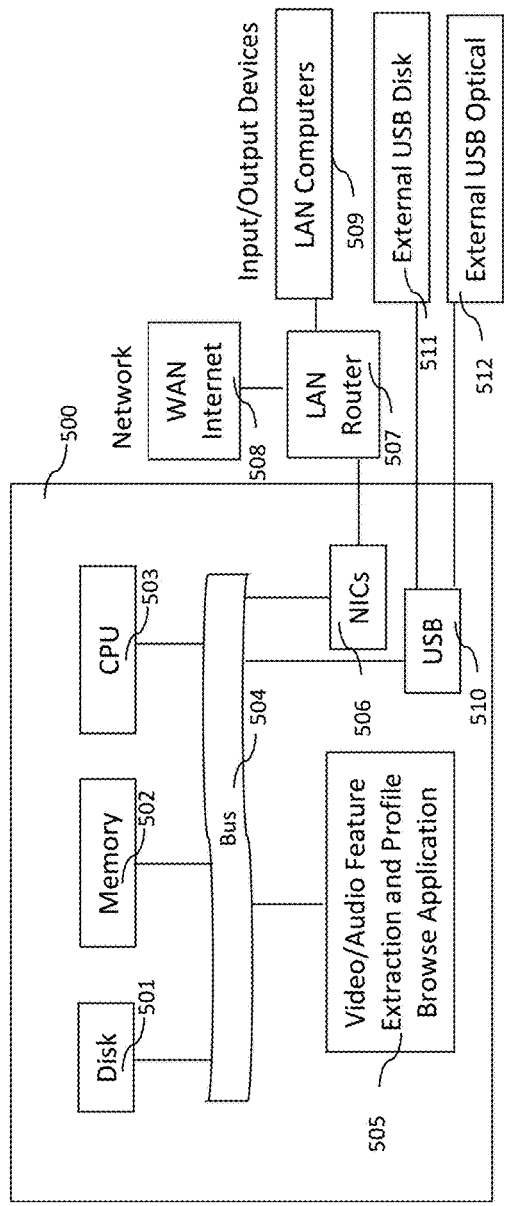
Fig. 5a: Example context within current computer and processing architecture
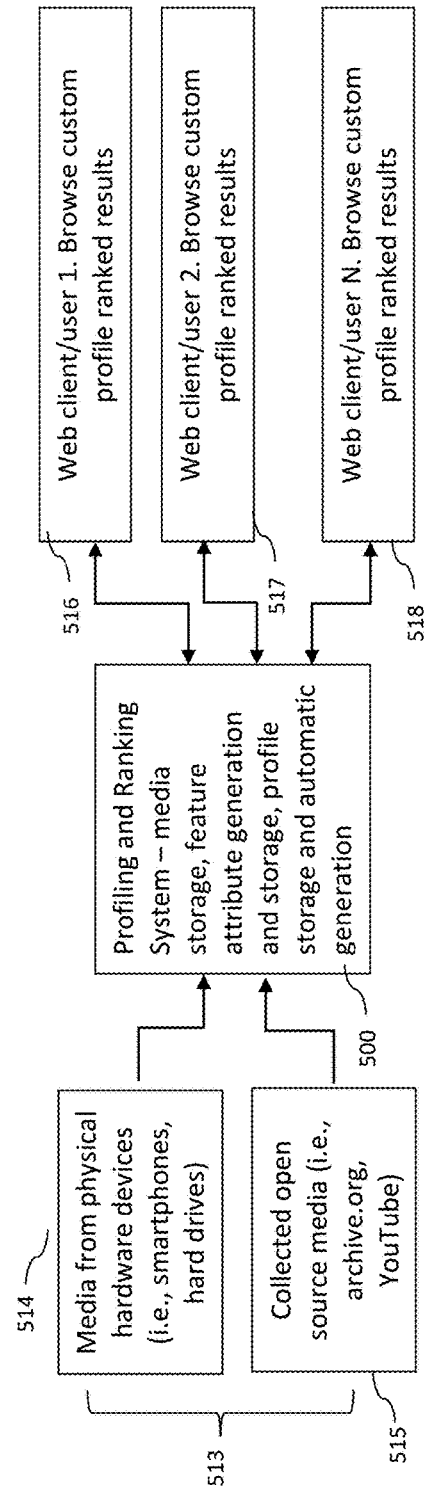
Fig. 5b: Media Asset Profiling and Ranking System in the context of data acquisition and client users

Fig 6a: Illustration of the top browse results, sorted by sort score, when a specific profile is applied to a random collection of 353 videos. The high, positive sort scores are representative of content a user is interested in promoting.

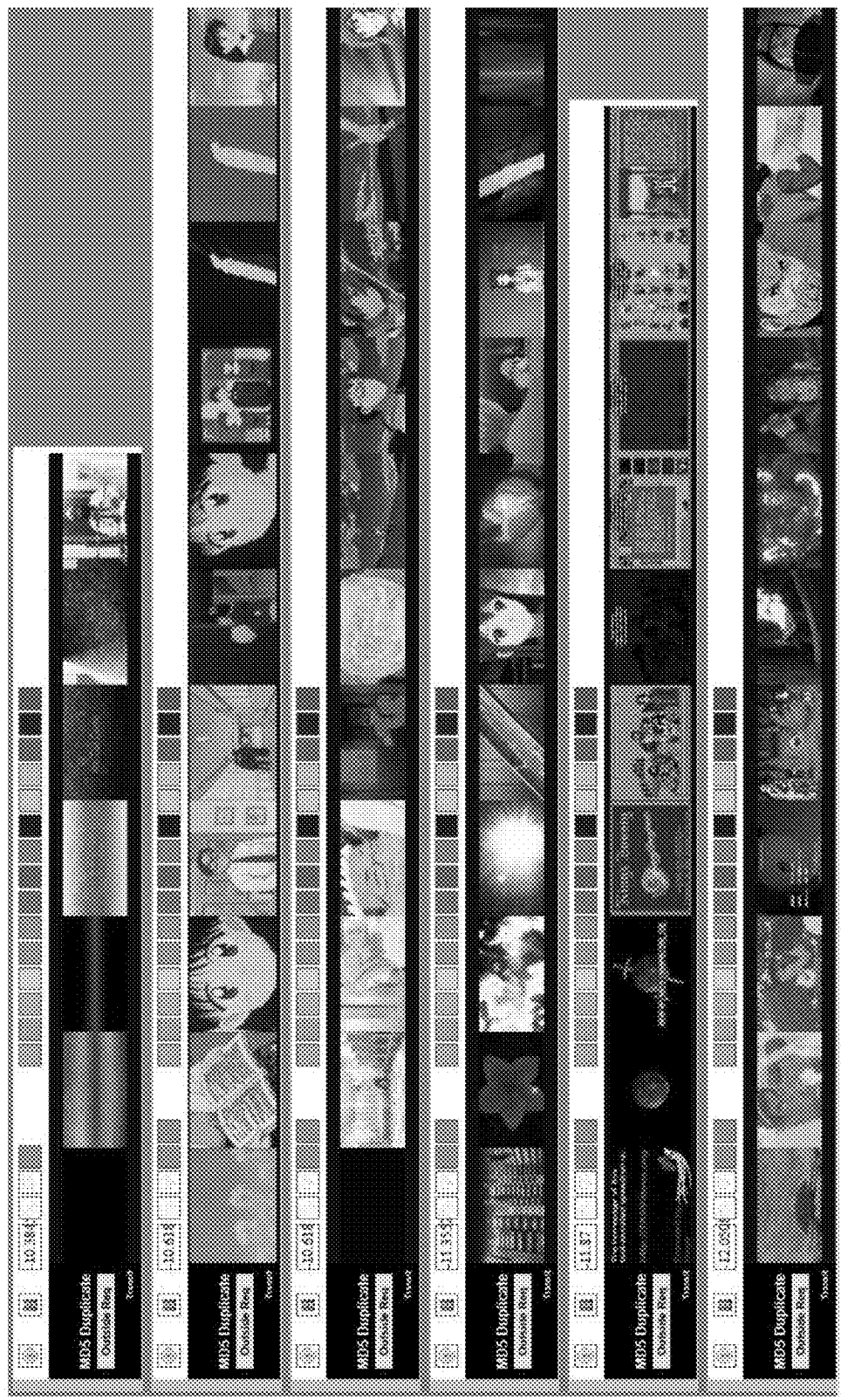
Fig 6b: Illustration of the bottom browse results, sorted by sort score, when the same profile applied to the same random collection of 353 videos shown in Fig 6a. The low, negative sort scores are representative of content a user is not interested in promoting.

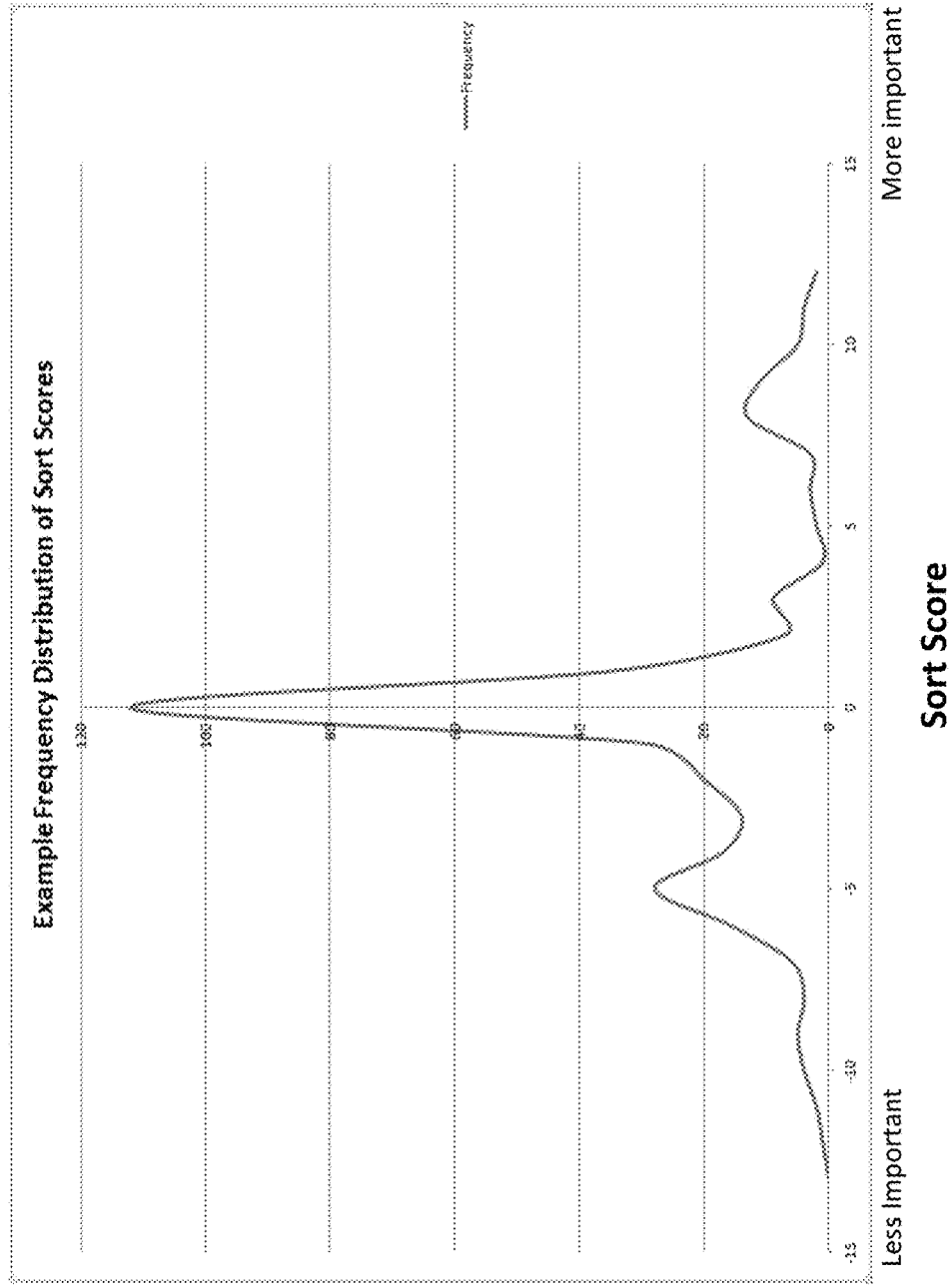
Fig 7: Example frequency histogram distribution of sort scores for the example profile applied to a the same collection of 353 videos shown in Figs 6a and 6b. Videos of more importance appear at the positive end of the distribution, while videos of less importance appear at the negative end of the spectrum.

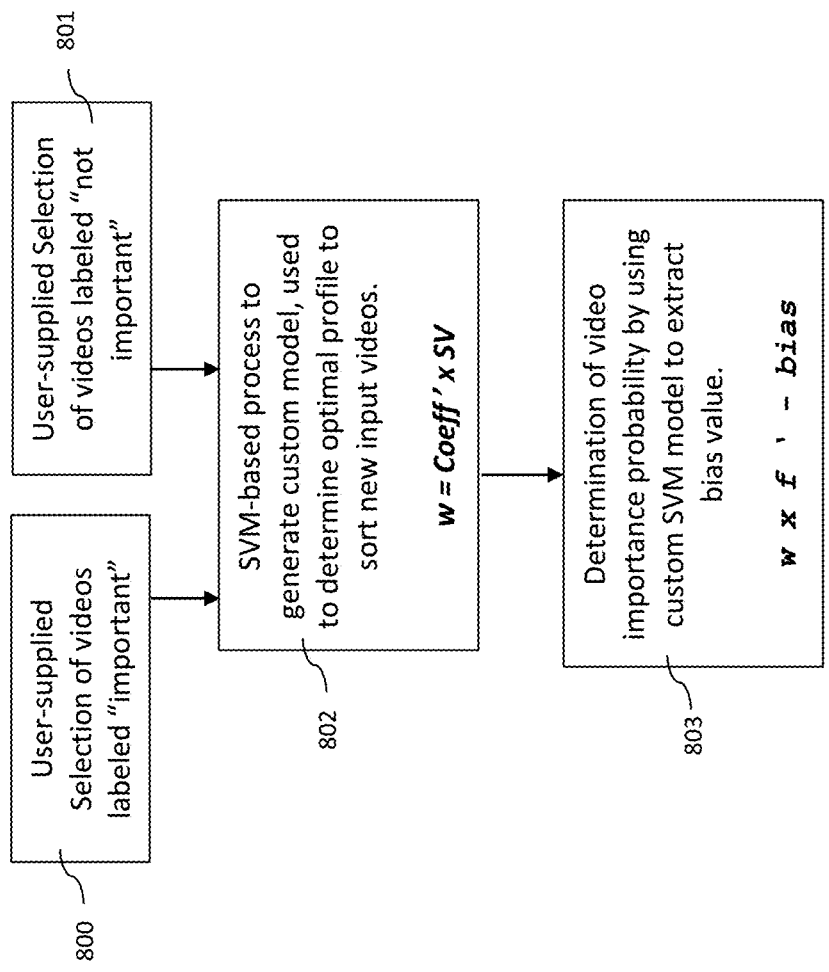
Fig. 8: SVM-based profile learning process, and application of the generated SVM model/profile to rank new videos.

AUTOMATED VIDEO CATEGORIZATION, VALUE DETERMINATION AND PROMOTION/DEMOTION VIA MULTI-ATTRIBUTE FEATURE COMPUTATION

BACKGROUND

1. Technical Field

This patent application relates to the triage of very large collections of digital media files.

2. Description of the Related Art

U.S. Pat. No. 8,233,708 assigned to Panasonic describes a video scene classifying device that arranges pictures based on a classification index which indicates a feature of the pictures. This patent describes how the recent expansion in the availability of video content has adversely affected the convenience of viewing, searching, and editing it. However this patent follows on to be primarily concerned with assigning "chapters" to a video. The user may then "skip view" chapters and determine "what kind of scene is coming after the skip". There is no discussion of ranking different videos based on level of user prioritized interest.

U.S. Patent Publication 2013/0038737 describes using Video Content Analysis (VCA) to detect and identify points of interest in a video. This patent application does describe a semantics-based video analysis where a user may manually enter textual or verbal information to generate a description of a scene. The user may, for example, segment and label various objects in a frame such as a road or a fence. But there is no description or suggestion of prioritizing or ranking different videos.

U.S. Pat. No. 8,891,020 describes processing digital video content to categorize "potential shots" via scene detection. The video preprocessor may output preprocess information including scene detection, shot detection scene cuts, dissolves, fade-ins, fade-outs, flashes and so forth. The resulting shots/scenes can then be identified and then arranged in ascending or descending order based on duration. For example, the classification may include only those scenes that are either shorter or longer than a threshold. Statistical analysis can be performed on the scenes with selected durations. The preprocessor is thus used to eliminate possible subsequent processing errors, but is not used to triage a priority-ranked list of videos.

U.S. Pat. No. 7,907,185 describes a search result ranking algorithm that utilizes one or more ranking parameters. The ranking parameters may include previous user feedback associated with custom content that corresponds to a search index, annotations of custom content provided by the user, or usage patterns derived from previous user accesses or searches. Other techniques for extracting and indexing content include techniques for indexing XML data, images, and videos. But this document provides no description of how a combinatorial methodology may be used to rank video content.

U.S. Patent Publication 2013/0198174 assigned to Microsoft ranks search results based on user configured rules. For example, a user may wish to display certain search results at the top or bottom of a ranked list. The ranking may derive from user-specified fields in a search such as a title, body, keyword, and file extension. The user may also specify match values such as gender:male, keyword:BrandName, or other criteria based on textual content analysis (for example "URL starts with", "results contain keyword", "title contains keyword", "title matches the phrase", and so forth.) Although it is mentioned that the system "includes video", there is no further description of the use of video other than to record still images or display video streams.

U.S. Pat. No. 9,143,742 describes a way to automatically analyze and rank media items or a plurality of intervals (e.g., a frame, or group of frames) of the media items, based on at least one criterion such as video quality video, audio quality, video characteristics (e.g., color, light, and/or motion), or audio characteristics (e.g., audio levels, noise, and/or pitch). However there is no discussion of combinatorial ranking based on user-prioritized interest or scene recognition.

U.S. Patent Publication 2016/0026707 describes clustering of search results based on similarity of multimedia content, determined based at least in part on a non-text-based analysis or representation of such content. For each of a plurality of search results, e.g., web pages, having associated multimedia content, a representation of the multimedia content is generated and the respective representations are used to determine a degree of similarity. The degree of similarity information is used to cluster search results, for example by presenting or otherwise associating together as a responsive cluster those pages that have been determined to the same and/or very similar multimedia content.

U.S. Pat. No. 9,235,625 describes determining a score for media content that depends on the number of annotations that identify the media source.

SUMMARY

Unfortunately, prior techniques that attempt to solve this problem suffer from several factors that can contribute to inaccuracies during the final ranked order presentation of the media assets. These include, but are not limited to, inaccuracies in media-related detections and classifications, the presence of objects, scenes and/or concepts not yet modeled, changes in content quality, absent video and/or audio data, and other problems.

In preferred embodiments, the system and methods described herein compute many feature attributes for each member of a set of incoming digital media assets, and then apply a custom digital media value profile across all analyzed members to create a value-sorted rank order of the set. Those assets deemed most important are shown at the top of the order, while conversely, those assets deemed least important will be shown last in the order.

More particularly, one or more features attributes are computed for each media asset, and then a custom profile is applied. The custom profile, which may be user-specific, weights the feature attributes accordingly in either a promotive or demotive manner, and then a final value sort score is determined for each media asset. Then, the entire collection of media assets is shown to the user in ranked order based on the determined value sort score. Media assets deemed most important to the user may be shown (or listed) first, whereas media assets deemed least important to the user may be shown last. The applied profiles are created on a custom-basis for each user based on the target use case, which is most likely different for each system installation, and often even between different users at the same analytical location.

A "feature attribute" is specifically defined herein as any visual or audio property that can be determined for a multimedia asset, and that can be reduced down to (represented as) a single scalar value, normalized on [0.0, 1.0].

A value sort score is defined herein as the value determined for a multimedia asset, after the application of all feature attributes though the profile weights and promote/demote.

In a typical implementation, many feature attributes may be computed for each media asset (also called a "media object" herein. Example feature attributes may range from discrete media classification (the automatic determination and application of one or more appropriate labels to the entirety of a digital media file, e.g., anime), scene classification within the media file, specific object/item detection, concept detection (the application of subjective labels based on a semantic interpretation on the media content), visual similarity with a priori watchlist frame content (which may be determined using the patented visual search technology described in U.S. Pat. Nos. 9,087,125 B2 and 8,295,611 B2 hereby incorporated by reference) and/or other audio analysis/classification. Techniques for visual and audio feature generation may also include, but are not limited to, Support Vector Machine (SVM) classification, deep learning and Convolutional Neural Network (CNN) application, and visual similarity search.

Custom user profiles apply a combinatorial equation to all feature attributes of a media asset. Profiles assign a weight to each feature attribute, and a sign value (for example, a "+" may be assigned to promote the attribute, and a "−"to demote the attribute).

A final value metric is determined for each media asset from the combinatorial equations, and an ordered ranking of all assets is presented to the user.

In some implementations, a profile can be learned, such as in the case where the user doesn't know what weights and/or signs each feature attribute should have. In one example, a group of videos may be separated by two class labels (e.g., "important", "not important") applied as input by the user to the set of media assets. The system can then use advanced SVM-based learning analytics to automatically determine a weighted profile that optimally sorts the input videos, and thus, new incoming videos, according to these class labels. This profile can then be used on other videos for a sort suited to the user.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating different embodiments.

FIG. 1 illustrates a general process flow governing the video frame and audio extraction, a possible scenario for feature attribute computation, and the application of the profile to determine a value metric for the media asset.

FIGS. 2a and 2b show examples of different media asset extracted frame storyboards, and the magnitude of a particular selected feature attribute that was most applicable to the asset relative to the content that the storyboard depicts (i.e., high soccer scene value for an asset whose storyboard clearly depicts soccer content).

FIG. 2c shows, for a single media asset, the values of 16 different feature attributes that applicable to the content depicted in the storyboard. High values represent content applicability, while low values convey the inverse.

FIG. 4 shows the application of a very specific profile, using weights and promote/demote decisions for each media asset, and how the final sort score is computed for a video using the properties of the defined profile.

FIGS. 5a and 5b illustrate a preferred embodiment in the context of current computer and processing architectures.

FIGS. 6a and 6b show, for a specific given profile application, the top 6 results of a rank order for a collection of hundreds of analyzed images, and the bottom 6 results for the same collection, respectively. The high, positive sort scores in FIG. 6a are representative of content a user is interested in promoting, while the low, negative sort scores are representative of content a user is not interested in promoting.

FIG. 7 shows, for the same profile and collection of videos shown in FIGS. 6a and 6b, the complete frequency histogram of all videos as a function of their sort score. Videos of more importance appear at the positive end of the distribution, while videos of less importance appear at the negative end.

FIG. 8 illustrates a process flow of the automatic SVM-based profile attribute weight/sign determination process and general profile generation, based on labeled input data from the user.

DETAILED DESCRIPTION OF PREFERRED EMBODIMENTS

Figure 3:
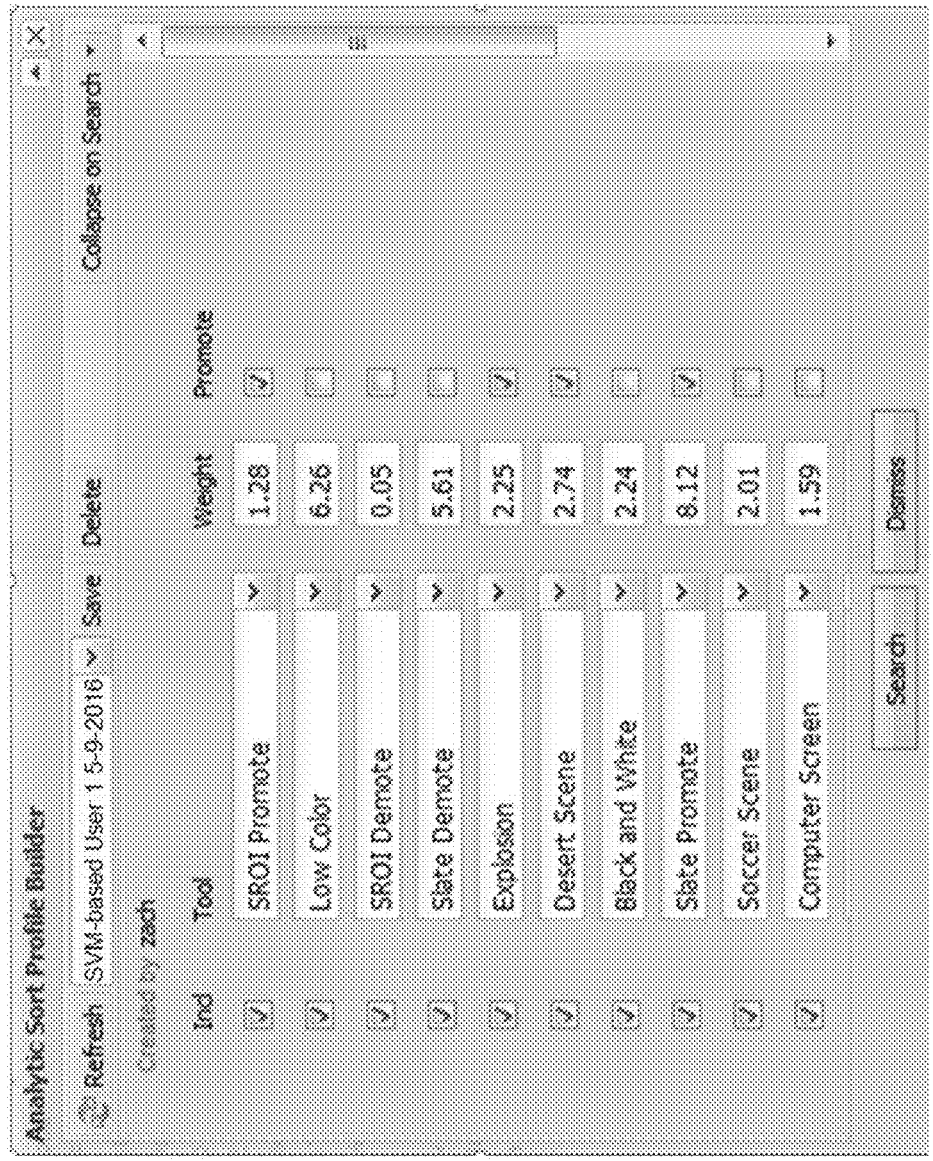
FIG. 3 shows an example of a system profile builder User Interface (UI) application, showing a custom profile, the weights of specific feature attributes, and whether those attributes are used to promote or demote each feature attribute during the application of the profile to a collection of assets.

A description of example embodiments of the invention follows.

Introduction

With the increasing presence of online multimedia as well as the overwhelming amount of media being created on a daily, and even hourly basis, the need for better and more efficient methods for users to quickly triage this increasing amount of digital media data is becoming evidently clear. Moreover, metadata that would be useful in classifying and organizing digital media can be missing, or worse, actually incorrect. In these most pervasive and common situations, the only other data to use is derived from the multimedia content itself.

The present system, a content-based media ranking system, analyzes both video and audio streams from digital multimedia files, and calculates a feature attribute (or feature attributes) that uniquely and abstractly describes the media in different ways. These feature attribute values are then weighted and signed during the profile application process to establish their value sort score, and subsequent ranking, relative to other assets by which the same criteria is applied. As with any solutions that rely on computer vision, errors in media classification-based analyses can occur frequently in real world applications, so it is important to select techniques, especially in the profile application process, that are invariant to these types of irregularities. The present system thus emphasizes tolerance to the variability found in a large generalized corpus of audio and video files, by relying on numerous feature attribute contributions simultaneously. Moreover, profiles can assign a higher weight to those feature attributes that are generally more reliable and less error-prone, if so desired. An error in one attribute can therefore be mitigated, and even overpowered by the other computed attributes.

Problem Statement

Given an arbitrary collection of digital media assets, we wish to present a user with a rank-ordered list of the assets based on a custom applied profile determining asset importance. The rank ordered list is created by applying a custom profile to a group of media assets that already have various feature attributes computed. The custom profile uses predetermined weights and signs for each feature attribute, to assign a final value sort score (coefficient) to each asset. Within the list, all assets are ranked according to the final value sort score.

Current Technical Approach of the Preferred Embodiment

The preferred multimedia object ranking approach via custom profile retrieval utilizes features attributes from both digital video and audio data. In a specific example, digital video, as well as digital audio (such as in the form of extracted Pulse Code Modulated (PCM) data) are used). Features attributes are then extracted from the data, in the form of detected video types, detected scenes/objects/concepts within a video, detected visual similarity against a priori watchlist video frames using patented visual search technology, and audio features. A custom profile is then applied, and the detected feature attribute values receive a weight and a sign. A combinatorial equation is applied to all weighted and signed attributes, and a final value sort score for the asset is computed. A ranked order of all assets is then presented based on a ranking of the value sort scores for all assets.

Feature Extraction

For each media asset, an attempt to extract both audio and video feature attributes takes place as an initial step. If either the audio or video stream is unavailable or encoded with an unrecognized codec, it is decided that no feature attribute extraction is possible for that stream. In addition, if the extracted stream yields 0 frames, no visual feature attribute extraction is attempted for that stream. In other words, at least 1 frame must be extracted from the video for visual feature attribute extraction to take place. Some feature attributes require a minimum number of audio samples or visual frames to be extracted, in order for the feature attribute to be successfully created.

Visual/Audio Feature Extraction

FIG. 1 illustrates an example of a high-level, general process flow and decision method for the audio/video extraction, the computation of the feature attributes, and the application of the custom user profile on the asset to determine the final value coefficient.

In step 100, a new, incoming video file is presented to the system. An attempt is then made to extract frames from the video. In one example, Joint Photographic Expert Group (JPG) frames are extracted from the original media file at a rate of 1 frame every 500 ms(or 2 frames per second). In step 101, a determination is made if at least 10 frames were generated. If so, in step 105, feature attributes that require at least 10 frames are generated. Then, in step 102, a determination is made if at least 2 frames were generated. If so, in Step 106, feature attributes that require at least 2 frames are generated. Then, in step 103, a determination is made if at least 1 frame was generated. If so, in Step 107, feature attributes that require at least 1 frame are generated. Lastly, in step 104, a determination is made if at least 4 seconds of audio was generated by examining a Pulse Code Modulated (PCM) audio (e.g., a 22050 KHz PCM (WAV) dual channel audio) file extracted from the original media file. If so, in Step 108, audio feature attributes that require at least 4 seconds of audio are generated.

With the audio and visual feature attributes computed, step 109 then applies a custom user profile to determine, for a given media asset, its final value sort score (coefficient) (step 110). After the ranked order list is shown to the user, the process ends at step 111.

In the preferred implementation, each of the visual and audio feature attributes computed in steps 105-108 are normalized to a constant in the range [0.0, 1.0], so that there is relative magnitude context to each feature prior to the application of the profile's weights and signs.

FIGS. 2a and 2b illustrate, for an example collection of ten (10) different videos, their storyboard which loosely convey their general depicted content, and for each video, a selected feature attribute that scores very highly, and can be visually validated against the storyboard. For example, using a Support Vector Machine (SVM) based technique, Example Video 1 shown in FIG. 2a received a "soccer" attribute value of 0.937, corroborating the depicted frame storyboard showing a soccer broadcast. Further, Example Video 2 in FIG. 2a received a "black and white" attribute value of 1.0, corroborating the depicted frame storyboard showing a black and white video broadcast. Further attributes are shown for other assets within FIGS. 2a and 2b. Example Video 3 has a high desert scene score, Example Video 4 a high orange jump suit score, and Example Video 5 a 1.0 "low color count value". Example Videos 6-10 have, respectively, relatively high scores for detected scenes of a explosion, computer screen, library, military plane, and military uniform.

FIG. 2c, on the other hand, shows sixteen (16) different possible feature attributes and corresponding feature attribute values for a single video asset. The reader can loosely corroborate the low/high values shown for each feature attribute against the content detected in the storyboard for the illustrated Example Video 11. These feature attribute values are what are then manipulated by the weights and signs, within a specific, applied custom user profile.

FIG. 3 shows, within the technology system's User Interface (UI), an example of how a custom user profile is presented to the user. The user profile can be changed/manipulated either by changing the weight magnitudes of each attribute, the sign designating either promotion or demotion (by either including or omitting the checkmark for "promote"), or both. The "incl" checkbox indicates whether the feature attribute should be included in the total value computation. If unchecked, it is not included nor considered. Also, as discussed further below, instead of manually determining these values, the profile attribute weights and signs to promote or demote can also be automatically determined empirically, by a user submitting a set of "important" and "not important videos", and the system arriving at the specific profile values that best rank order the input data. The created profile can then be used on other collections of data for optimal rank sorting of digital media for that particular user (See for example the discussion of FIG. 8 below).

FIG. 4 shows a detailed application of a specific profile set of weights and signs for an example use case. The general equation for the asset value coefficient is shown at the top of FIG. 4. Then, for steps 400-411, FIG. 4. shows the application of the weight and a positive sign to promote the attributes in the set of promotable features (which in this example, include slate promote, SROI (logo) promote, orange jumpsuit, desert, explosion scene, and percent audio speech). (Note that here "SROI" is a reference to a Static Region of Interest analysis that looks for small-scale static content, in relation to surrounding non-static content, typically good for finding and recognizing logos and other identifying marks in video feeds.) Conversely, for steps 412-427, FIG. 4 shows the application of the weight and a negative sign to demote the corresponding attribute (which in this case includes the set of slate demote, SROI (logo) demote, soccer, low color count (anime, cartoons), computer screen/presentation, black and white, percent audio silence, and percent audio non speech). In step 428, the total weighted promotion score is calculated. In step 429, the total weighted demotion score is calculated, and in step 430, the total value sort score coefficient (or final sort score) for the asset is then calculated by summing the promotion and demotion quantities.

FIGS. 5a and 5b illustrate the digital media asset profile ranking technology housed within an example of a current compute environment for which it was designed. FIG. 5a shows an example system disk 501, memory 502, CPU 503 and the media feature attribute computation and profile ranking logic 505 interconnected within a data processing environment 500 by a bus 504. The profile ranking logic 505 may be implemented by a software program running in the CPU 503 or may be implemented in whole or in part in fixed logic or programmable logic circuits (such as field programmable gate arrays).

It should be understood that other elements of a data processing system may be present, such as input devices that provide video/audio data sources and output devices such as displays and audio speakers. However, these elements are not critical to the operation of the profiling and ranking techniques described herein. The data processing environment communicates to local external devices via a Universal Serial Bus (USB) port 510, and communicates with other networked devices via one or more Network Interface Cards (NIC) 506. The NIC(s) are connected directly to a Local Area Network (LAN) router 507. In turn, the LAN router allows connectivity to other LAN computers 509 as well as the outside Internet 508. The input source videos for the retrieval technique typically originate from Internet downloads via HyperText Transfer Protocol (HTTP) or File Transfer Protocol (FTP) 508, or from other networked LAN computer disks 509, local USB external disk 511 or local USB optical disk 512, either via Compact Disc (CD) or Digital Video Disc (DVD). Output retrieval results might be stored on local disk 501, stored locally on external USB devices 511 512, stored on network computer disk 509, or served in real time to internet-based clients 508 from a media server.

FIG. 5b is one such example arrangement of the data processor 500, a media server 513 and client machines 516-518. The multimedia assets may originate from physical devices such as disk drives or smartphones that are accessible to the system and then stored in a media server 513. In addition, multimedia assets may originate from outside the local system including public external sources, including but not limited to open media sources such as YouTube™, archive.org, file sharing networks and the like which are then stored in the media server 513. Data processor 500 then access the media server 513 to obtain a media object, extracting frames and/or audio therefrom, and otherwise performing the asset ranking methods described in connection with FIGS. 1-4 above and FIGS. 7-8 described below. Data processor 500 may also be accessible via a web server to one or more web clients 516-518 so that users may enter their custom profile information such as via the user interface shown in FIG. 3. The same web server/client interfaces may present the rank results such as described in connection with FIG. 6 below.

Results

FIGS. 6a and 6b show the head and tail distributions of a rank order list of an example set of 353 unstructured and random digital media assets, with the specific profile described and used in FIGS. 3 and 4. In FIG. 6a, the first 6 assets in the rank order sort are shown, conveying the general properties of the profile described: promoting slates and logos of interest, and promoting desert scenes, explosions, orange jump suits, and assets containing a high percentage of determined speech. Conversely, FIG. 6b shows the bottom 6 assets in the rank order, conveying the general properties of the profile described: demoting slates and logos of non-interest, demoting computer screen presentations, assets of low color (anime, cartoons), soccer, black and white content, and demoting those assets deemed to have high percentages of non speech and silence. For this particular collection of 353 assets, and determined profile, the shown asset rank distributions in FIGS. 6a and 6b was considered to be very optimal for the user in question, because the digital media files that were important to him were promoted to the front of the list (logos and slates of interest, media files containing deserts scenes and orange jump suits.) Conversely, digital media files that were not important to the user were clearly demoted to the bottom of the list, mainly anime, cartoons, computer web demonstrations, and soccer broadcasts.

FIG. 7 illustrates, for the same applied profile and collection of 353 media assets, the complete frequency distribution as a function of sort score. Videos of more importance appear at the positive end of the distribution, while videos of less importance appear at the negative end of the spectrum.

FIG. 8. shows an alternative workflow to a user creating a profile, its attribute weight and sign values from scratch. Often times a user will know what particular assets are and are not important to them. But that user does not have a a clear idea of exactly which attributes are important, and what to weight them as. In this instance, a user can collect a set of videos that they deem "important", and a second set that they deem "not important", and the system will determine the feature attributes and weights.

More specifically, in one example, in order to separate and sort sample videos based on their importance, they are first marked as "important", "not important", and optionally "neutral" by the user. Then, a class label+1 is assigned to those videos that are important, and a class label of −1 is assigned to those that are not important, and videos that are not in either of these two classes are removed, for training purposes. Using an Epsilon-SVR (Support Vector Relation) type of Support Vector Machine (SVM) with a linear kernel, assuming that s is the number of support vectors and n is the number of features, the primal variables w can be found using the formula below:

$$w = \text{Coeff} \times SV$$

where Coeff is a 1×s vector of coefficients and SV is a s×n matrix of support vectors. A bias value is also retrieved from the model. From this point on, the probability estimate of another sample video can be found with n features being important or not important by multiplying w by the features vector and deducting the bias:

$$\text{probability of importance} = w \times f' - bias$$

The higher this value, the more probable it is that the video is "of interest". A negative value indicates that the video probably belongs to "not important" class. As a result, a set of videos can thus be sorted relative to one another by using this defined probability of importance.

CONCLUSION

Existing techniques utilized in academia and industry attempt to solve the problem of custom video ranking and sorting. However, many of them are based on either scene segmentation, chapter determination, or text metadata exploitation, none of which either attempt to describe contextual scenes, objects and concepts within a digital media file, in conjunction with using those descriptions, under the umbrella of a customer, user-driven profile paradigm, to create a sorted rank order of assets that is optimal to the user triage experience, as this proposed technique does.

What is claimed is:

1. A method for sorting a set of media assets comprising:
   a. accepting user input assigning a weight and a promotable or demotable feature value for one or more media asset feature attribute types;
   b. locating a selected video in the set;
   c. extracting one or more frames from the selected video;
   d. determining a first feature attribute value for a feature attribute that depends on a content-related aspect of the selected video that relates to visual content recognition, wherein the content-related aspect includes a recognized scene type;
   e. determining a second feature attribute value for a feature attribute that depends on some other aspect of the selected video that is not the content-related aspect used for determining the first feature attribute;
   f. determining a combined profile value for the selected video from the first and second feature attributes values, the weights, and the promotable and demotable feature value for each feature attribute type, the resulting combined profile value depending on $$\sum_{i=1}^{N}(PromotableFeature_i * Weight_i) - \sum_{j=1}^{M}(DemotableFeature_j * Weight_j);$$

and
   g. assigning a ranking for the selected video in the set of videos from the combined profile value.

2. The method of claim 1 wherein determining the first and second feature attribute values is programmatic.

3. The method of claim 1 wherein the content-related aspects further include one or more of a specific slate, a computer screen, or a recognized object of interest.

4. The method of claim 1 wherein a feature type is a slate having a predetermined promote/demote attribute.

5. The method of claim 3 wherein the content-related aspects further include one or more of black and white pixels, color distribution, low color, non-low color, audio speech, audio non-speech, and audio silence.

6. The method of claim 1 wherein the content-related aspects depend upon how many frames can be extracted from the selected video.

7. A method for ranking a set of multimedia object comprising:
   obtaining a sorting profile, the sorting profile including a set of two or more feature attributes, and a weight and a promotable or demotable feature value for each feature attribute, the two or more feature attributes including at least two different scene classifications;
   computing a score for each multimedia object by
      extracting video frames from the object;
      computing a raw value for two or more feature attributes from the extracted video frames;
      determining the score for the object from the raw values and the weight and the promotable and demotable feature value associated with each of the feature attributes in the sorting profile, the score depending on $$\sum_{i=1}^{N}(PromotableFeature_i * Weight_i) - \sum_{j=1}^{M}(DemotableFeature_j * Weight_j);$$

displaying a representation one or more of the objects in a list ranked by the score for each object.

8. The method of claim 7 wherein the sorting profile is specific to a user.

9. The method of claim 8 wherein the feature attributes and promote/demote value for each feature attribute are obtained as input from the user.

10. The method of claim 1 wherein each feature attribute is a visual or audio property that can be determined for the multimedia object that can be represented as a single scalar value.

11. The method of claim 10 wherein the scalar values are normalized on a range of [0.0, 1.0].

12. The method of claim 7 wherein the feature attributes further include one or more of discrete media classification, application of one or more labels to the object, visual item detection, application of subjective labels based on a semantic interpretation of the object content, visual similarity with a watchlist frame content.

13. The method of claim 8 wherein the sorting profile is obtained by the user applying "important" and "not important" class labels to a set of media objects.

14. The method of claim 13 wherein the class labels are used by Support Vector Machine analytics to automatically determine weights for the sorting profile.

* * * * *